May 15, 1934.　　　　H. M. ROBERTSON　　　　1,958,448
KILN
Filed Oct. 7, 1931　　10 Sheets-Sheet 1

INVENTOR.
Harry M. Robertson
Geo. B. Pitts
BY
ATTORNEY.

May 15, 1934.  H. M. ROBERTSON  1,958,448

KILN

Filed Oct. 7, 1931  10 Sheets-Sheet 2

INVENTOR.
Harry M. Robertson
Geo. B. Pitts
ATTORNEY.

May 15, 1934. H. M. ROBERTSON 1,958,448
KILN
Filed Oct. 7, 1931 10 Sheets-Sheet 4

INVENTOR.
Harry M. Robertson
BY Geo. B. Pitts
ATTORNEY.

May 15, 1934.　　　H. M. ROBERTSON　　　1,958,448
KILN
Filed Oct. 7, 1931　　　10 Sheets-Sheet 7

Fig. 9

INVENTOR.
Harry M. Robertson
BY
Geo. B. Pitts
ATTORNEY.

Patented May 15, 1934

1,958,448

UNITED STATES PATENT OFFICE 1,958,448

KILN

Harry M. Robertson, Cleveland, Ohio

Application October 7, 1931, Serial No. 567,454

7 Claims. (Cl. 25—142)

This invention relates to a kiln of the rotary or circular type, more particularly a kiln having a circular, material carrier which is continuously driven in one direction. The kiln may be used for burning various materials, including shale and clay in globule form and crushed lime stone.

One object of the invention is to construct a kiln of this type adapted to continuously receive material and provided with means for continuously removing the material from the carrier.

Another object of the invention is to construct a kiln of this type having a relatively wide carrier for the material to provide for large output.

Another object of the invention is to provide a kiln structure wherein materials may be uniformly subjected to predetermined temperatures, within normal ranges, to insure the desired color effects and complete burning of all material supplied to the carrier.

Another object of the invention is to construct a kiln of this type in which improved means are provided for agitating the material to insure uniform burning thereof.

A further object of the invention is to construct a kiln of this type in which are provided a plurality of agitating mechanisms for the material to insure uniform burning and quick cooling thereof.

Other objects of the invention will be apparent to those skilled in the art to which my invention relates from the following description taken in connection with the accompanying drawings, wherein.

Figure 4:
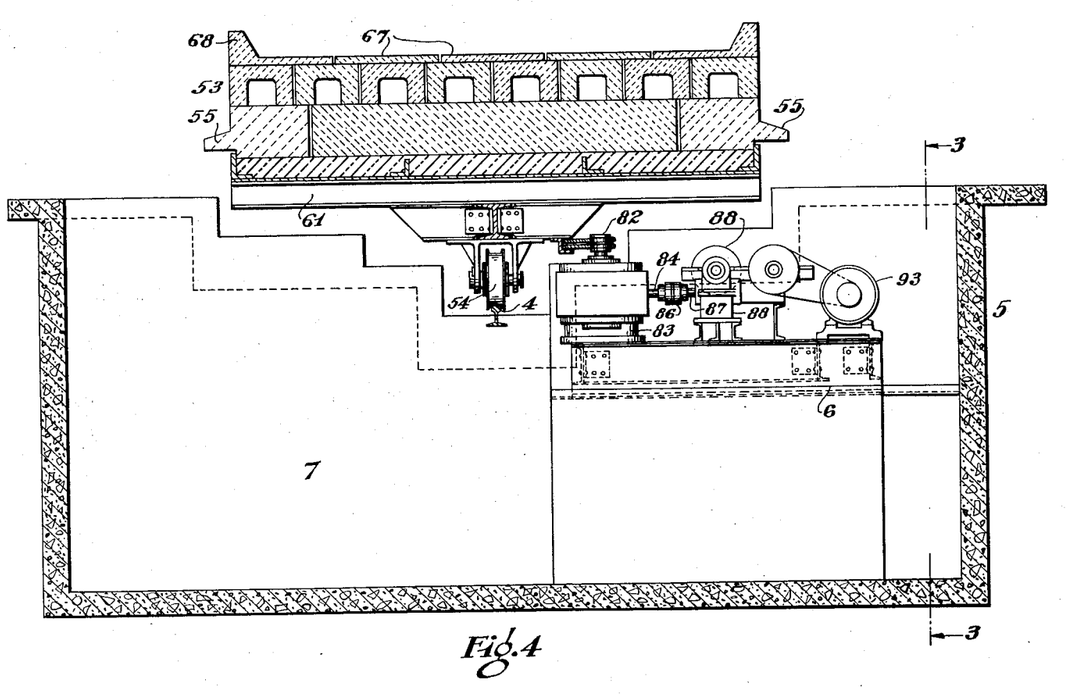
Fig. 4 is a section on the line 4—4 of Fig. 2.
Figure 5:
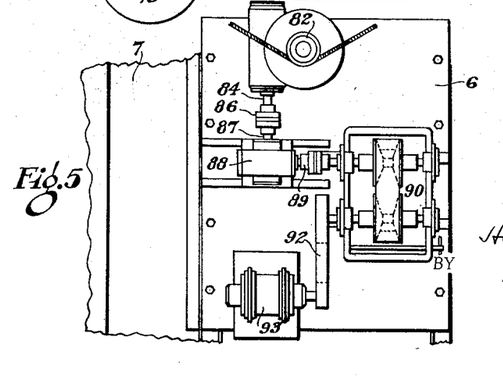
Fig. 5 is a fragmentary plan view of parts shown in Figs. 1, 2 and 3.
Figure 6:
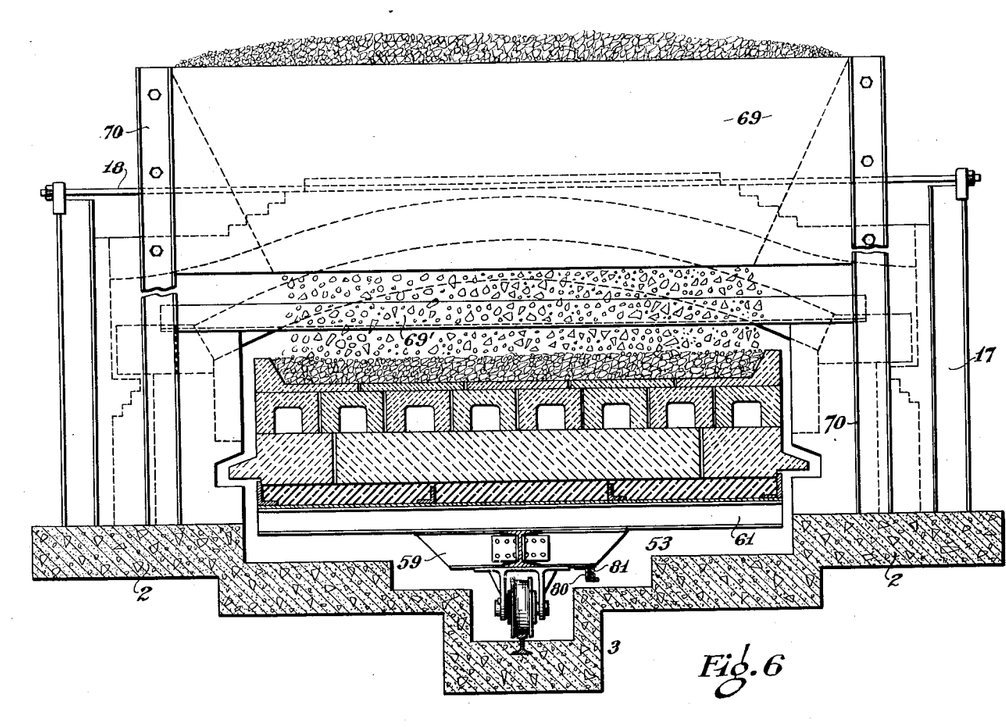
Fig. 6 is a section on the line 6—6 of Fig. 1.

In the drawings, 1 indicates a foundation having lateral supporting portions 2 and a sunken central portion 3 on which is mounted trackage 4, preferably consisting of a single rail. The portions of the foundation between the portions 2, 3, are preferably stepped. The foundation 1 is of circular contour and the portions above referred to and track 4 are disposed in concentric relation. The foundation 1 has incorporated in it a pit 5 (see Fig. 4), providing a bed 6 for a purpose later to appear and a passage 7 leading from the exterior side of the foundation to the interior side thereof to permit of ready access to the inner wall of the kiln structure and combustion means mounted in said wall.

8 indicates as an entirety the kiln structure built on the lateral portions 2 and extending around the foundation 1 a distance somewhat greater than 180°, whereby the inlet end and outlet end are spaced a suitable distance to provide an open space between them, so that loading or supply and discharge of the material may be carried out.

The structure 8 consists of side walls 9 and an arch 10, which form a preheating zone 11, a firing or burning zone 12 and a cooling zone 13 in contiguous relation, so that the material is successively subjected to a preheating atmosphere, a firing or burning atmosphere and a cooling atmosphere.

Figure 9:
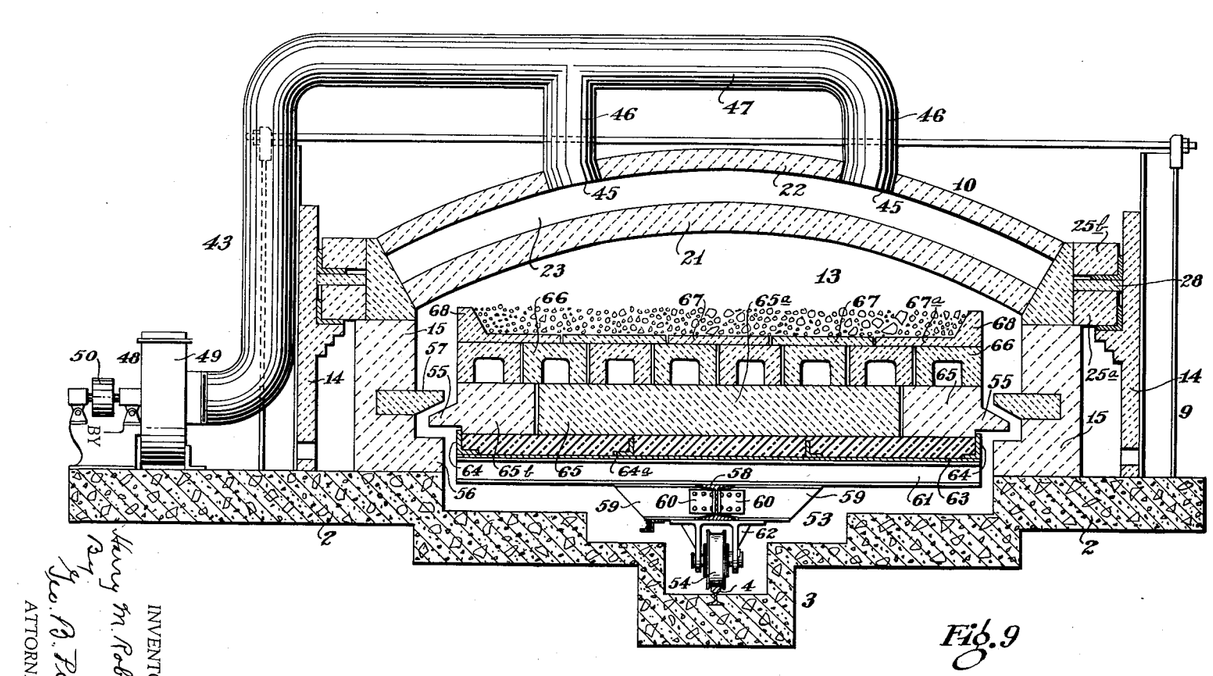
Fig. 9 is a section on the line 9—9 of Fig. 1.
Figure 10:
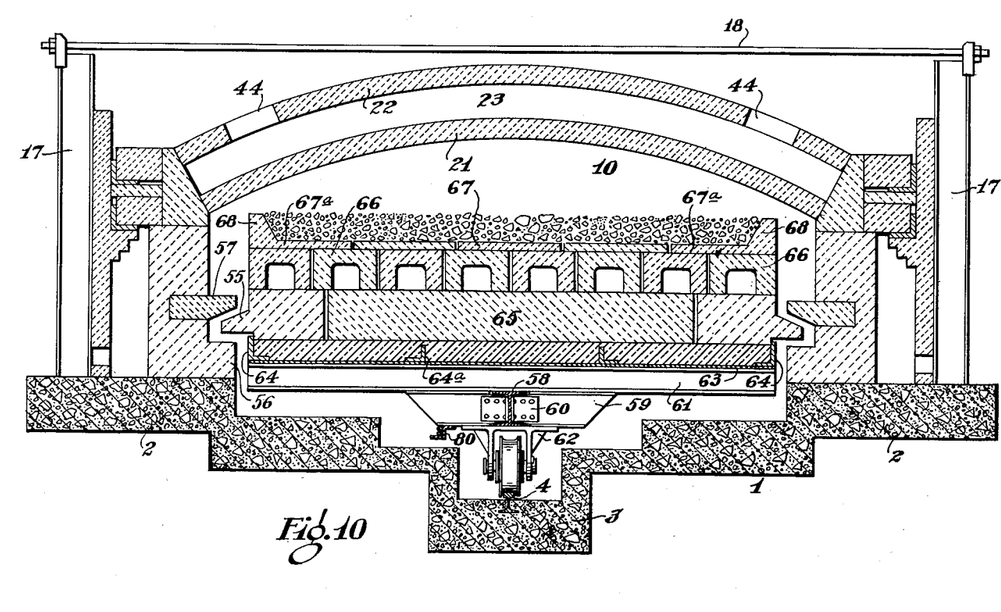
Fig. 10 is a section on the line 10—10 of Fig. 1.

Each side wall 9 comprises an outer wall 14 formed of suitable fire brick, and an inner spaced wall 15 formed of refractory bricks, the space between these walls throughout the preheating zone 11 and firing zone 12 being filled with diatomaceous earth 16. The outer wall 14 is preferably braced by uprights 17, which may be embedded at their lower ends in the foundation portions 2 and tied together at their upper ends by rods 18. The arch 10 throughout the preheating zone 11 and firing zone 12 comprises a crown wall 19 formed of refractory material and a covering 20 therefor, the covering being formed of suitable insulating material. Throughout the cooling zone the arch 10 comprises spaced crown walls 21, 22, forming an air chamber 23 between them. The longitudinal sides of the crown wall 19 are supported on slabs or blocks preferably inner and outer blocks 24, 25, formed of high heat resisting material and resting on the wall 15 and an angle 26 supported on a ledge 27 provided on the wall 14. The walls 21, 22, are similarly supported except that I prefer to provide two outer blocks 25a, 25b, separated by a refractory slab 28 (see Figs. 9 and 10).

Figure 2:
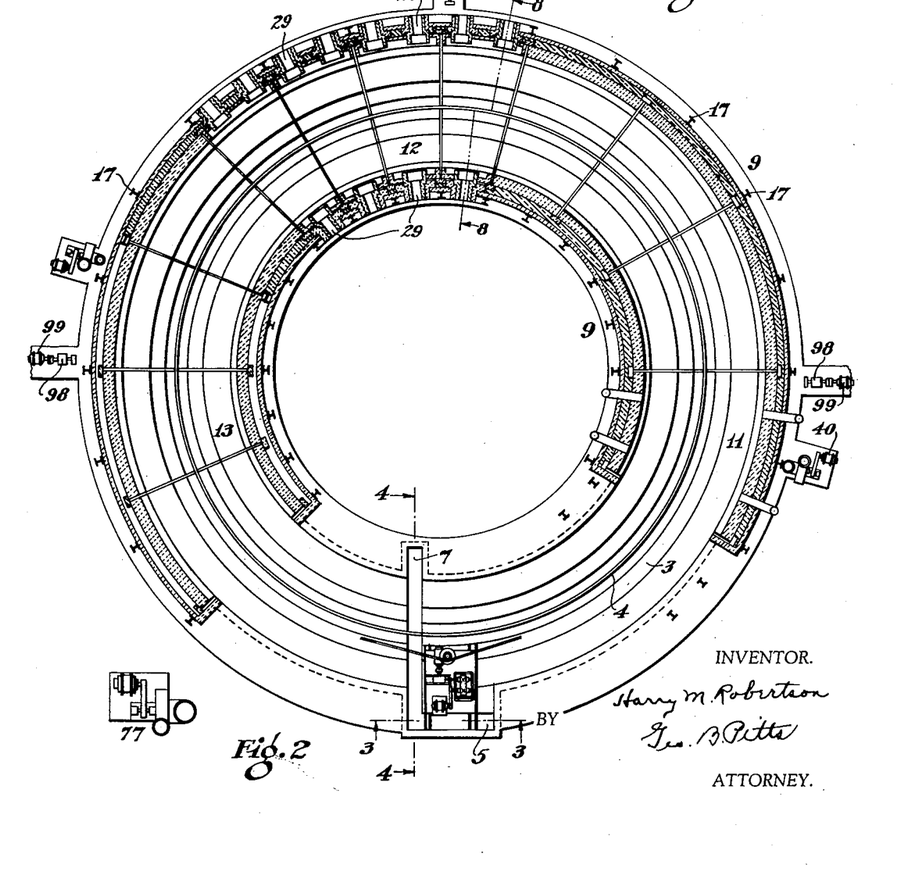
Fig. 2 is a horizontal sectional view on the line 2—2 of Fig. 7.
Figure 3:
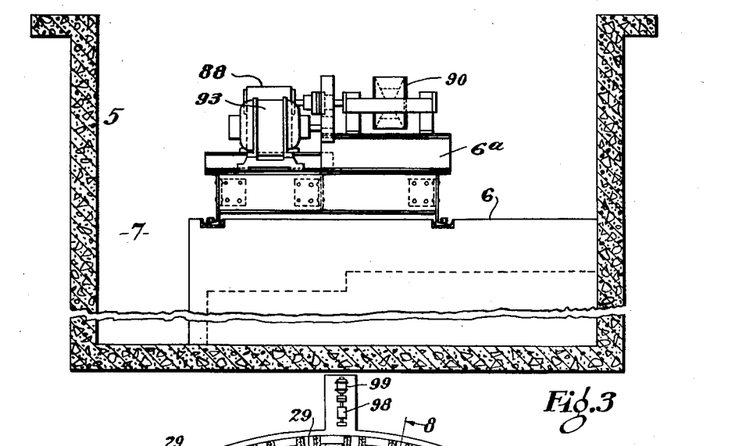
Fig. 3 is a section on the line 3—3 of Figs. 2 and 4.
Figure 8:
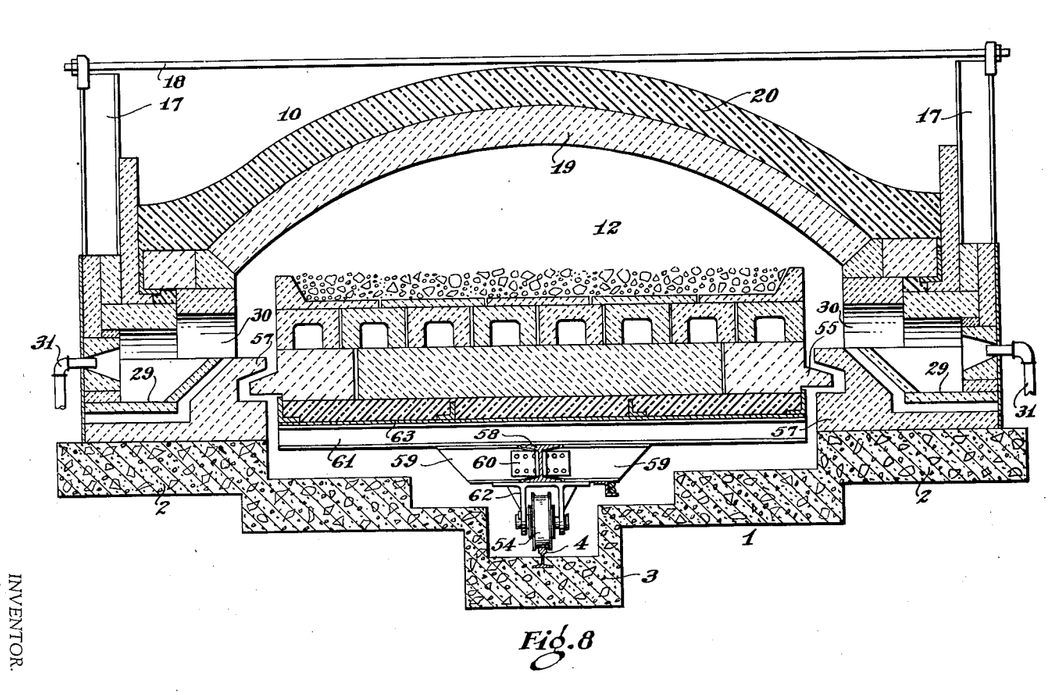
Fig. 8 is a section on the line 8—8 of Figs. 1 and 2.

29 indicates fire boxes provided in the side walls 9. As shown in Fig. 2, I provide four fire boxes in the inner wall 9 and eight fire boxes in the outer wall 9, but the number of such boxes may be increased or decreased, at will. Each box 29 is of suitable construction and is incorporated in the side walls 9 as shown in Fig. 8, the rear of the box communicating through an enlarged port 30 with the zone 12, whereby the products of combustion and heating gases are applied to the material to be fired or burned and maintain a substantially predetermined degree of temperature in the firing zone 12. The fire boxes 29 are illustrated as adapted to burn a suitable fuel, such as gas or oil, which is supplied by a pipe 31. The burner is shown diagrammatically, the air supply for combustion purposes being omitted.

It will be noted that while I have disclosed herein a kiln of the "open fire" type, the improvements constituting my invention are not to be limited to this form of construction, since the conditions or the material being fired may make it desirable to use a muffle or semi-muffle type of kiln.

Figure 7:
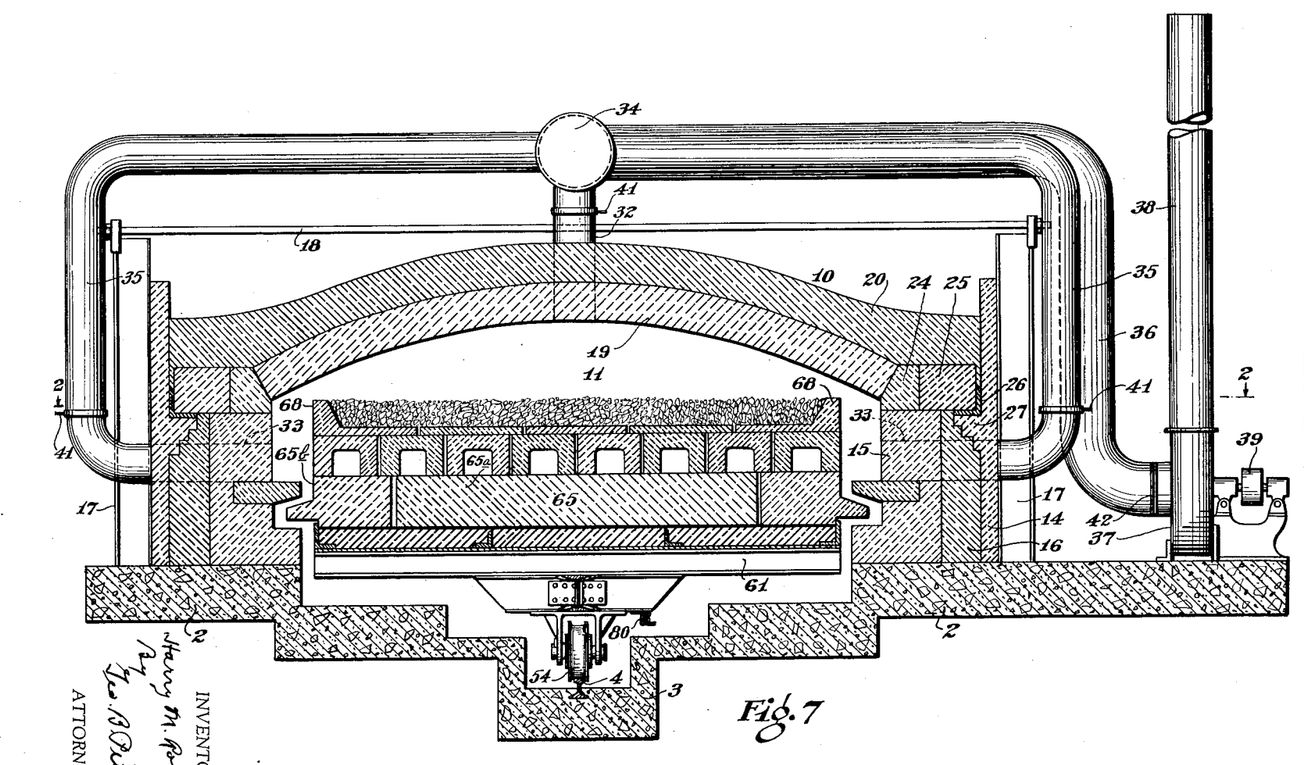
Fig. 7 is a section on the line 7—7 of Fig. 1.

32, 33, indicate outlets leading from the outer end portion of the preheating zone 11. The outlet 32 leads through the arch walls 19 and 20 (Fig. 7) and is connected to a collecting manifold or drum 34. The outlets 33 lead from the zone 11 through the side walls 9, there preferably being two such outlets leading through each wall, each connected by a pipe 35 to the drum 34. 36 indicates a conduit leading from the drum 34 to the intake side of a power driven suction fan, the fan being inclosed in a casing 37 having an inlet for the conduit 36 and an outlet connected to a chimney 38. The fan shaft carries a pulley 39, driven by a belt from the shaft of a suitable motor 40 (see Fig. 1). The suction effect of the fan serves to induce a flow of the products of combustion, heating gases supplied to the heating zone 12 and heated air constituting the atmosphere therein through such zone and the preheating zone 11 to preheat the material passing or moving in the opposite direction, as later set forth, such atmosphere being exhausted into the chimney 38. By providing a plurality of outlets 33 leading from the sides of the zone 11, I am enabled to convey away any cold or free air which may drift into the zone 11 with the carrier through the inlet end of the kiln, and hence prevent such air from cooling the atmosphere being drawn through the zone 11. The outlet 32 and each pipe 35 is provided with a damper 41 to control the flow therethrough independently and in relation to the control of the remaining dampers. The conduit 36 is preferably provided with a damper 42.

43 indicates means for effecting a circulation of air through the chamber 23. At or adjacent the exit end of the zone 13 I form one or more (preferably two) inlet openings 44 in the arch wall 22. At a point remote from the exit end, the arch wall 22 is formed with one or more (preferably two) outlet openings 45 to which are connected pipes 46 connected to a conduit 47. The conduit 47 is connected to the intake side of a power driven suction means 48 comprising a fan mounted in a casing 49 and driven in any suitable manner, the conduit 47 being connected to the inlet opening of the casing. The driving means for the fan preferably consists of a pulley 50 fixed to the fan shaft and driven by a belt 51 engaging a pulley on the shaft of a motor 52. The suction means 48 serves to draw air through the openings 44, and through the chamber 23, thereby carrying away or exhausting the air radiating from the material and conducted through the arch wall 22.

53 indicate as as entirety an endless carrier for the material mounted on a plurality of spaced wheels 54, which engage the track 4. The carrier 53 has a width approximately equal to the distance between the inner walls of the foundation portions 2, and preferably comprises a unitary circular or annular structure continuously rotated at a uniform, predetermined speed. The outer and inner side walls of the carrier are provided with lateral ribs 55 which run between members 56, 57, projecting from the inner walls 15, the purpose being to prevent intake of cold air or outflow of products of combustion and heating gases.

The carrier 53 preferably comprises the following: 58 indicates curved I-beams set substantially end to end. 59 indicates radial beams extending from either side of and secured to the beams 58 by angles 60. 61 indicates upper radial beams supported intermediate their ends on and suitably secured to the beams 58, 59. It will be understood that the beams 59, 61, are preferably arranged radial to the axis of the kiln and may be spaced any desired distance. 62 indicates bolsters secured to the under sides of the I-beams 58 and radial beams 59 and providing bearings for axles for the wheels 54. 63 indicates a base plate secured to the beams 61. The plate 63 is made in sections and forms a bed entirely around the carrier. 64 indicates angles secured to the plate 63 and extending throughout its circumference, there being one angle 64 along both the inner and outer edges of the plate and a plurality of angles 64a between them. The plate 63 is covered with a suitable insulation, such as cement, and forms a base for the body portion of the carrier. The angles 64 form side walls for the insulation. The insulation covers the intermediate angles 64a, whereas the flanges 64 at the sides of the plate may extend above the cement base to provide stops for the body portion.

The body portion of the carrier is formed entirely of refractory material and consists of basal members 65 fitting between the flanges 64 and covering the base, hollow blocks 66 mounted on the basal members 65 and refractory plates or slabs 67 mounted on the blocks 66, the outer slabs 67a having upwardly extending sides 68 to support the material. The plates 67 and sides 68 serve as a holder or receiver for the material to convey it in the direction indicated by the arrow (Fig. 1) through the zones 11, 12, 13 and through the exit end of the kiln where the material is continuously removed from the carrier, as later set forth. The basal members 65 may comprise a central member 65a and side members 65b. Between the basal members 65 and blocks 66 and between the latter and the slabs 67 I may provide suitable interlocks to maintain them in assembled relation.

Figure 1:
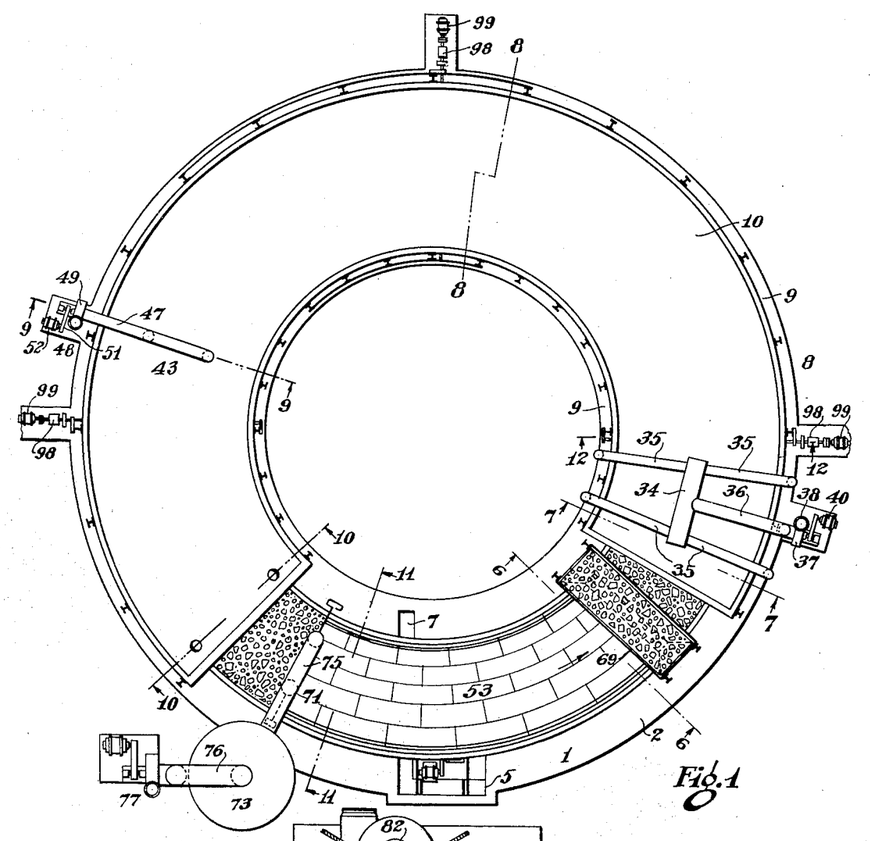
Fig. 1 is a plan view of a kiln embodying my invention.

69 indicates a hopper from which the material is delivered to the carrier, the feed from the hopper being preferably regulated in relation to the speed of the carrier so as to fill the holder with a layer of material having a depth equal to the height of the sides 68. The hopper 69 is supported above the carrier 53, so that the material may gravitate thereon, the bottom of the hopper being formed with an elongated outlet for the material, as shown in Fig. 1. The hopper 69 is maintained full or substantially full by any desired means of supply (not shown). By preference, the hopper is secured to I-beams 70 mounted in the foundation portions 2 at opposite sides of the carrier 53, so that the hopper may extend over it radially of its axis.

Figure 11:
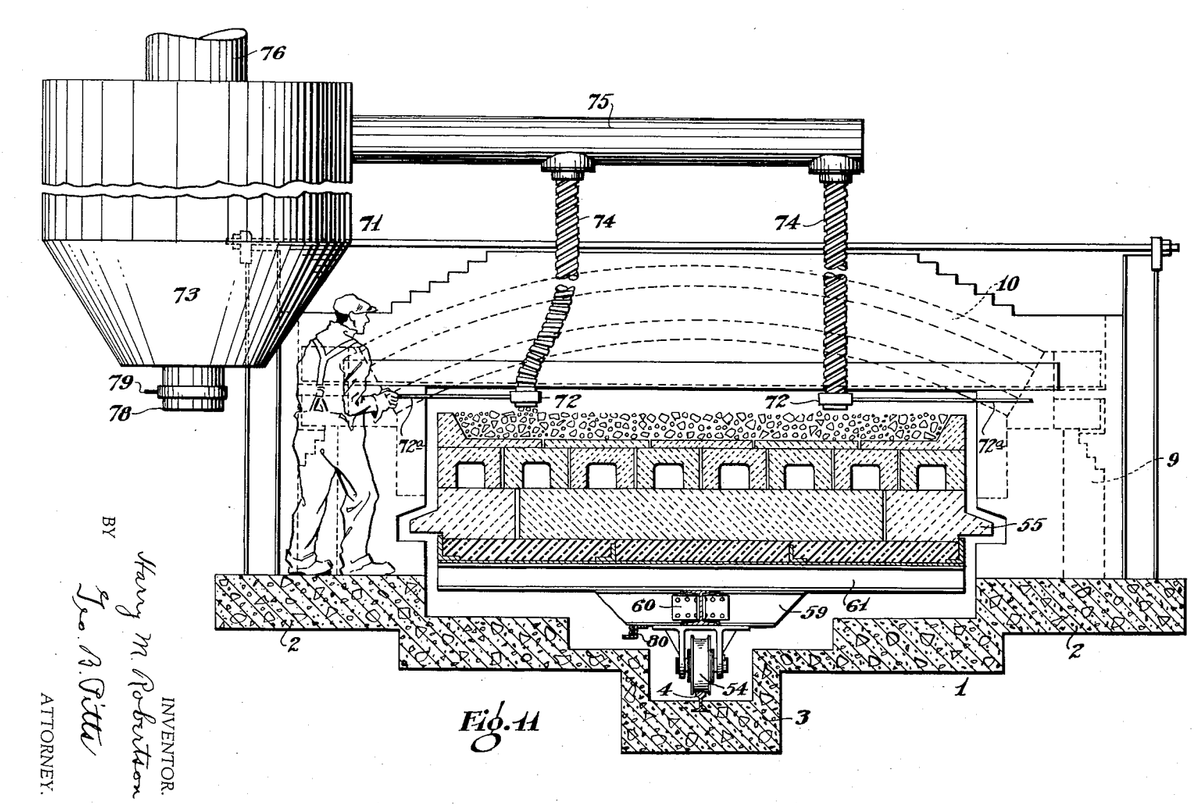
Fig. 11 is a section on the line 11—11 of Fig. 1; also, showing the manual operation of one of the suction means.

71 indicates as an entirety means for removing the burned material from the carrier, such means being preferably arranged beyond the exit end of the cooling zone 13. The means herein shown is of the suction or vacuum type and comprises one or more (preferably two) suction nozzles 72 adapted to be moved over the moving material, whereby the latter is sucked off the carrier and conveyed to a collecting chamber 73. Each nozzle 72 is mounted on the lower end of a relatively large flexible pipe 74, which depends from a conduit 75. The conduit 75 is connected to the upper portion of the collecting chamber 73. 76 indicates a conduit leading from the upper end of the chamber 73 and connected to the intake of a power operated suction means 77 preferably similar to the suction means and its drive already referred to. The suction means 77 is arranged to set up sufficient vacuum or suction effect at the nozzles 72 to draw into them and through the pipes 74 and conduit 75 the material in a continuous, substantially uniform stream, the material being delivered into the chamber 73, which being relatively large as compared to the conduit 75, effects a reduction of suction pressure within the chamber and permits the material flowing thereinto to gravitate downwardly to the bottom of the chamber. The material may be discharged from the chamber 73 through a pipe 78, controlled by a slide valve 79. The pipes 74 being flexible, the nozzles may be manipulated over the bed by any desired means, but preferably manually as shown (Fig. 11). In this latter mode of operation, each nozzle 72 is provided with a handle, that is, a long rod 72a, which is manipulated or guided over the material by the operative. The flexible pipe 74 for each nozzle is somewhat longer than the distance from the pipe 75 to the surface of the receiver or holder, to insure close engagement therewith and also to permit the nozzle to be guided over a relatively large area. The pipes 74 are so mounted with respect to the side walls 68 and each other that the nozzles 72 thereon may be guided over the entire area of the material.

The means for rotating the carrier 53 preferably consists of the following: 80 indicates a wall provided on and surrounding the carrier and constituting a drum for a flexible member, such as a steel cable 81, which preferably encircles the wall a plurality of times to insure frictional driving engagement therewith, and at a suitable point (preferably adjacent that portion of the foundation 1 between the inlet and exit ends of the kiln structure) the cable extends to and around a driven member, such as a drum 82, preferably extending around the latter a plurality of times, whereby it winds thereon and thereoff, to effect driving of the cable. The wall 80 may consist of a double angled member, the upper angle being secured to the under sides of the beams 59, the body portion of the member serving as the drum for the cable and the lower angle extending outwardly and serving as a guide. The shaft for the drum 82 is suitably mounted in bearings in a casing 83 and provided with a worm gear meshing with a worm fixed to a shaft 84, the shaft being suitably mounted in bearings in a side casing 85 forming part of the casing 83. The shaft 84 is connected by a coupling 86 to a shaft 87 which is driven through a worm and worm gear within the casing 88 by a shaft 89. The shaft 89 is driven by the driving means 90, in a frame 91, which means is operated by a belt 92 engaging a pulley fixed to the shaft of a motor 93. Any suitable means may be provided for stopping and starting the motor and regulating its speed and also separate means, such as a clutch, may be provided to stop the shaft 84. The driving means 90 constitutes what is known as a Reeves drive and embodies an adjustment to change the speed of the shaft 89. The power mechanisms above described are mounted on a frame 6a, which in turn is adjustable on the bed 6 substantially radially of the foundation 1, to insure tautness of the cable 81 and frictional engagement thereof with the drums.

94 indicates as an entirety means for agitating the material during its travel through the zones 11, 12, 13, whereby substantially all portions of the material are successively preheated, burned or fired and cooled, the purpose being to insure uniformity of operation and elimination of waste material due to over-burning or under-burning, such uniformity being particularly advantageous where predetermined color effects are desired, as in the use of the material for the manufacture of roofing. I prefer to employ or use an agitating means in each zone 11, 12, 13, but any thereof may be omitted when desired or more than one such means may be used in each zone. As the agitating means in the zones 11, 12 and 13 are similar in construction, the description of one (the one in the preheating zone 11) will suffice for the remaining ones.

Figure 12:
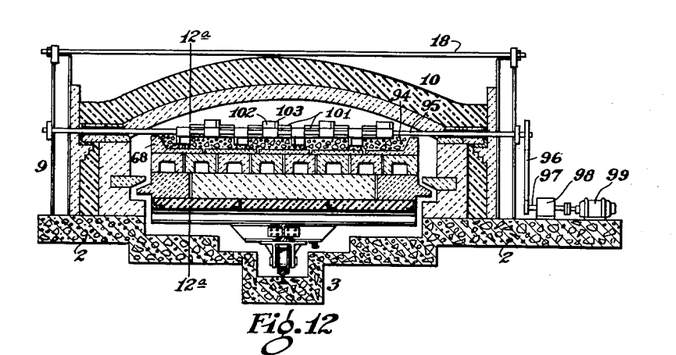
Fig. 12 is a section on the line 12—12 of Fig. 1.
Figure 12A:
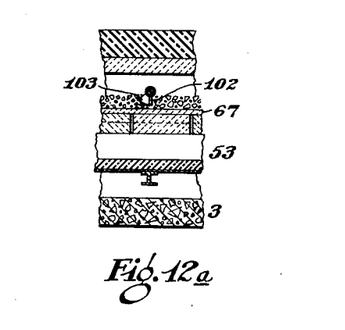
Fig. 12a is a section on the line 12a—12a of Fig. 12.

The construction of agitating means shown in Figs. 1 and 12 comprise a shaft 95 extending radially through the zone 11 and mounted in suitable bearings in the walls 9 thereof, one end of the shaft extending beyond one wall, preferably the outer wall and carrying a sprocket, which is engaged by a chain 96, the chain engaging a driven sprocket fixed to a shaft 97. The shaft 97 is driven through suitable reduction gearing within a housing 98 by a motor 99. 100 indicates a plurality of agitators fixed to the shaft 95 and arranged between the up-standing, annular side walls 68 of the receiver or holder. As shown in Fig. 12, the agitators extend radially of the shaft 95 and as they are revolved thereby they stir the material, turn over portions thereof and effect a mixing of the material so that its under portions are replaced by upper portions to expose the under portions to the atmosphere in the zone. The agitators are arranged at different angular positions about the shaft 95, adjacent agitators being preferably arranged at an angle of 90° to each other and alternate agitators being arranged at an angle of 180° to each other. Also, alternate agitators may consist of radially extending plates 101 and each of the remaining agitators may consist of radially extending plate 102 and a side wall 103 at right angles thereto. The shaft 95 is driven at such speed that the movement of the agitators through the material is relatively fast as compared to the speed of the carrier 53, where the direction of movement of the agitators while engaging the material is in the same direction as the material. When desired, the agitators may be driven in the opposite direction. When driven in either direction the speed of the shaft may be regulated according to the consistency of the material to secure the most efficient operation.

Figure 13:
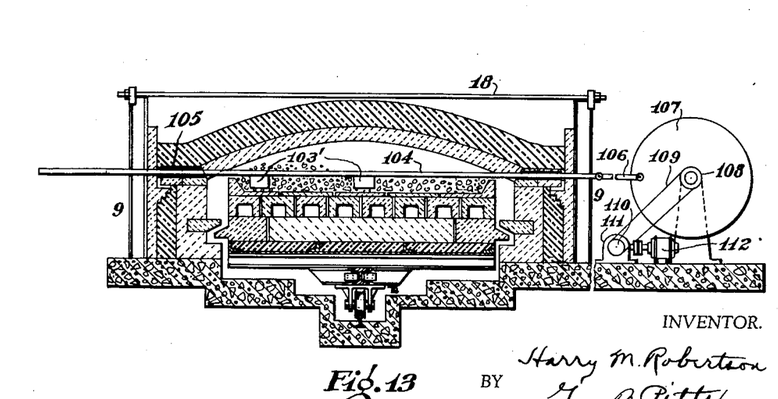
Fig. 13 is a section similar to Fig. 12, but showing a modified form of agitating mechanism.

Fig. 13 shows a slightly different construction of agitating means in which the agitators consist of elements which reciprocate transversely through the material preferably in a plane or planes disposed radially of the kiln structure. In this arrangement each agitator 103' consists of a plate or a pair of plates disposed radially and depending from a bar 104 into the material. The bar 104 is arranged to reciprocate endwise, being slidably mounted at its end portions in guides 105 provided in the side walls 9. The outer end portion of the bar 104 has pivoted to it a pitman rod 106 pivotally connected to a crank disk 107. The shaft for the crank disk 107 is provided with a sprocket 108, engaged by a suitable chain 109, which engages a driven sprocket 110. The sprocket 110 is driven by gearing enclosed in the housing 111 and power being applied thereto by a motor 112. Where each bar 104 is provided with one plate 103' it is moved a distance substantially equal to the width of the receiver or holder; where two plates 103' are employed in the same plane, as shown the movement of the bar is reduced.

In the operation of my apparatus, the carrier 53 is rotated at a predetermined speed and by means of the hopper 69 and an adjustable closure for its delivery opening, sufficient material is allowed to gravitate onto the carrier to supply thereto a layer or bed of material of substantially uniform depth between the side walls 68. As the material is carried through the preheating zone 11 it is gradually heated and also agitated so as to bring it approximately to the temperature of the firing zone, which is maintained at substantially 2000 degrees F.; as the material is carried through the zone 12 it is fired or burned and also agitated to expose all portions of the material to the firing temperature; and as the material is carried through the cooling zone it is again agitated whereby cooling of all portions of the material may be effected. Upon the movement of the material beyond the exit end of the zone 13, the material is discharged or removed from the carrier. From the foregoing description it will be seen that my process is carried on continuously, the material being supplied continuously to the carrier, which conveys it through the zones and then continuously discharged from the carrier.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A kiln comprising a foundation supporting trackage of annular shape, a carrier having wheels mounted on said trackage, a structure on said foundation consisting of contiguous preheating, firing and cooling zones disposed concentrically to said trackage, means for heating said firing zone, said carrier being movable through said zones as it rotates on said trackage, means for rotating said carrier, means adjacent the inlet end of said preheating zone for continuously supplying material to said carrier, and suction means having an intake nozzle adapted to remove the material from said carrier.

2. A kiln comprising a foundation supporting trackage of annular shape, a carrier having wheels mounted on said trackage, a structure on said foundation consisting of contiguous preheating, firing and cooling zones disposed concentrically to said trackage, means for heating said firing zone, said carrier being movable through said zones as it rotates on said trackage, means for rotating said carrier, means adjacent the inlet end of said preheating zone for continuously supplying material to said carrier and suction means having a flexible pipe terminating in a nozzle, said pipe permitting the nozzle to be moved over the material, whereby it will be removed from the carrier.

3. A kiln comprising an annular, movable carrier, means for rotating said carrier, preheating and firing zones disposed in contiguous relation and concentrically to the axis of said carrier, means for heating said firing zone, means for supplying material to said carrier at a point adjacent the inlet end of said preheating zone, means beyond said firing zone for removing material from said carrier, and means in each of said zones for agitating the material as it passes therethrough.

4. A kiln comprising an annular, movable carrier, means for rotating said carrier, preheating and firing zones disposed in contiguous relation and concentrically to the axis of said carrier, means for heating said firing zone, means for supplying material to said carrier at a point adjacent the inlet end of said preheating zone, means beyond said firing zone for removing material from said carrier, and means in each of said zones for agitating the material as it passes therethrough, the agitating means in said firing zone being arranged intermediate its ends.

5. A kiln comprising an annular, movable carrier, means for rotating said carrier, preheating and firing zones disposed in contiguous relation and concentrically to the axis of said carrier, means for heating said firing zone, means for supplying material to said carrier at a point adjacent the inlet end of said preheating zone, means beyond said firing zone for removing material from said carrier, and means in one of said zones for agitating the material as it passes therethrough, said agitating means comprising a relatively stationary shaft extending across the material on the carrier, devices secured to and extending from said shaft and arranged to engage and agitate or mix the material when said shaft is rotated and means for rotating said shaft.

6. A kiln comprising an annular, movable carrier, means for rotating said carrier, preheating and firing zones disposed in contiguous relation and concentrically to the axis of said carrier, means for heating said firing zone, means for supplying material to said carrier at a point adjacent the inlet end of said preheating zone, means beyond said firing zone for removing material from said carrier, and means in one of said zones for agitating the material as it passes therethrough, said agitating means comprising a bar extending across the material on the carrier and mounted to reciprocate endwise, a device depending from the bar and movable through the material to agitate it, and means for reciprocating said bar.

7. A kiln comprising a foundation supporting trackage of annular shape, a carrier having wheels mounted said trackage, a structure on said foundation consisting of contiguous preheating, firing and cooling zones disposed concentrically to said trackage, means for heating said firing zone, said carrier being movable through said zones as it rotates on said trackage, means for rotating said carrier, means adjacent the inlet end of said preheating zone for continuously supplying material to said carrier, and suction means having an intake nozzle adapted to remove the material from said carrier, said suction means comprising a conduit and a connection between said conduit and said nozzle permitting said nozzle to move laterally over the bed of material and toward and from the bed.

HARRY M. ROBERTSON.